(12) United States Patent
Xiong et al.

(10) Patent No.: US 10,981,275 B2
(45) Date of Patent: Apr. 20, 2021

(54) ROBOT CONTROL METHOD, APPARATUS AND STORAGE MEDIUM WITH THE SAME

(71) Applicant: UBTECH Robotics Corp, Shenzhen (CN)

(72) Inventors: Youjun Xiong, Shenzhen (CN); Zhiying Wu, Shenzhen (CN); Yidan Wang, Shenzhen (CN); Hui Lin, Shenzhen (CN)

(73) Assignee: UBTECH ROBOTICS CORP, Shenzhen (CN)

( * ) Notice: Subject to any disclaimer, the term of this patent is extended or adjusted under 35 U.S.C. 154(b) by 339 days.

(21) Appl. No.: 16/261,572

(22) Filed: Jan. 30, 2019

(65) Prior Publication Data
US 2019/0232494 A1 Aug. 1, 2019

(30) Foreign Application Priority Data
Jan. 30, 2018 (CN) .......................... 201810094970.0

(51) Int. Cl.
*B25J 9/16* (2006.01)
*B25J 9/12* (2006.01)

(52) U.S. Cl.
CPC ............. *B25J 9/1664* (2013.01); *B25J 9/126* (2013.01)

(58) Field of Classification Search
CPC .................... B25J 9/126; B25J 9/1664; G05B 2219/41195; G05B 2219/50216; G05B 2219/33119; G05B 19/4141
See application file for complete search history.

(56) References Cited

U.S. PATENT DOCUMENTS

| 2009/0128080 | A1* | 5/2009 | Cheng ................ G05B 19/0423 318/625 |
| 2010/0125343 | A1* | 5/2010 | Hung ...................... G08C 19/00 700/3 |
| 2016/0151909 | A1* | 6/2016 | Hardouin ................... B25J 9/08 700/245 |
| 2019/0193266 | A1* | 6/2019 | Ishii ....................... B25J 9/1692 |
| 2019/0270201 | A1* | 9/2019 | Ding ........................ B25J 9/163 |

* cited by examiner

*Primary Examiner* — Dale Moyer

(57) ABSTRACT

The present disclosure provides a robot control method, apparatus and a storage medium with the same. The method includes: obtaining a serial number and a rotational angle parameter of a first servo corresponding to a preset motion frame portion of a first motion; obtaining a serial number of a second servo located symmetrical to the first servo; receiving an instruction for mirroring the preset motion frame portion; performing a preset mirroring processing on a rotational angle parameter of the second servo according to the instruction; and storing the mirrored rotational angle parameter in a motion frame portion of a second motion; performing the first motion and the second motion. In the above-mentioned manner, the difficulty in adjusting the motion frame in the mirroring operation of the robot is largely simplified, and the accuracy and efficiency of the mirroring operation are improved.

20 Claims, 5 Drawing Sheets

ROBOT CONTROL METHOD, APPARATUS AND STORAGE MEDIUM WITH THE SAME

CROSS REFERENCE TO RELATED APPLICATIONS

This application claims priority to Chinese Patent Application No. 201810094970.0, filed Jan. 30, 2018, which is hereby incorporated by reference herein as if set forth in its entirety.

BACKGROUND

1. Technical Field

The present disclosure relates to intelligent robot technology, and particularly to a robot control method, apparatus and a storage medium with the same.

2. Description of Related Art

With the development of technology and the improvement of people's living standards, robots have gradually involved in people's lives and provided various humanized services for human beings.

In order to meet various needs, a robot needs to edit a large number of motions. Since most robots have a bilaterally symmetrical structure, there is a necessary to edit bilaterally symmetrical motions when editing and designing their motions. For example, when editing a motion, it needs to form a waving motion with several motion frames. When a motion frame is to be edited or adjusted, the angle of an output shaft of each servo of the robot needs to be edited. In the prior art, when editing a symmetrical motion of a robot, it is generally to edit one side first, and then the value of each servo is manually copied to the other symmetrical side; when editing multiple symmetrical motions or a complex symmetrical motion, it will be very inefficient to find the corresponding servo to edit, copy and paste manually, and is prone to errors.

BRIEF DESCRIPTION OF THE DRAWINGS

To describe the technical schemes in the embodiments of the present disclosure more clearly, the following briefly introduces the drawings required for describing the embodiments or the prior art. Apparently, the drawings in the following description merely show some examples of the present disclosure. For those skilled in the art, other drawings can be obtained according to the drawings without creative efforts.

DETAILED DESCRIPTION

The present disclosure will be further described in detail below with reference to the accompanying drawings and embodiments. In particular, the following embodiments are merely illustrative of the present disclosure, and are not intended to limit the scope of the present disclosure. Also, the following embodiments are only part of the embodiments of the present disclosure, not all of the embodiments of the present disclosure, and all other embodiments obtained by those skilled in the art without creative efforts are within the scope of the present disclosure.

It should be noted that, the following embodiments are all in the same inventive concept, the description of each embodiment has its focus, and the details which are not described in the individual embodiment can refer to the corresponding description in other embodiments.

Figure 1:
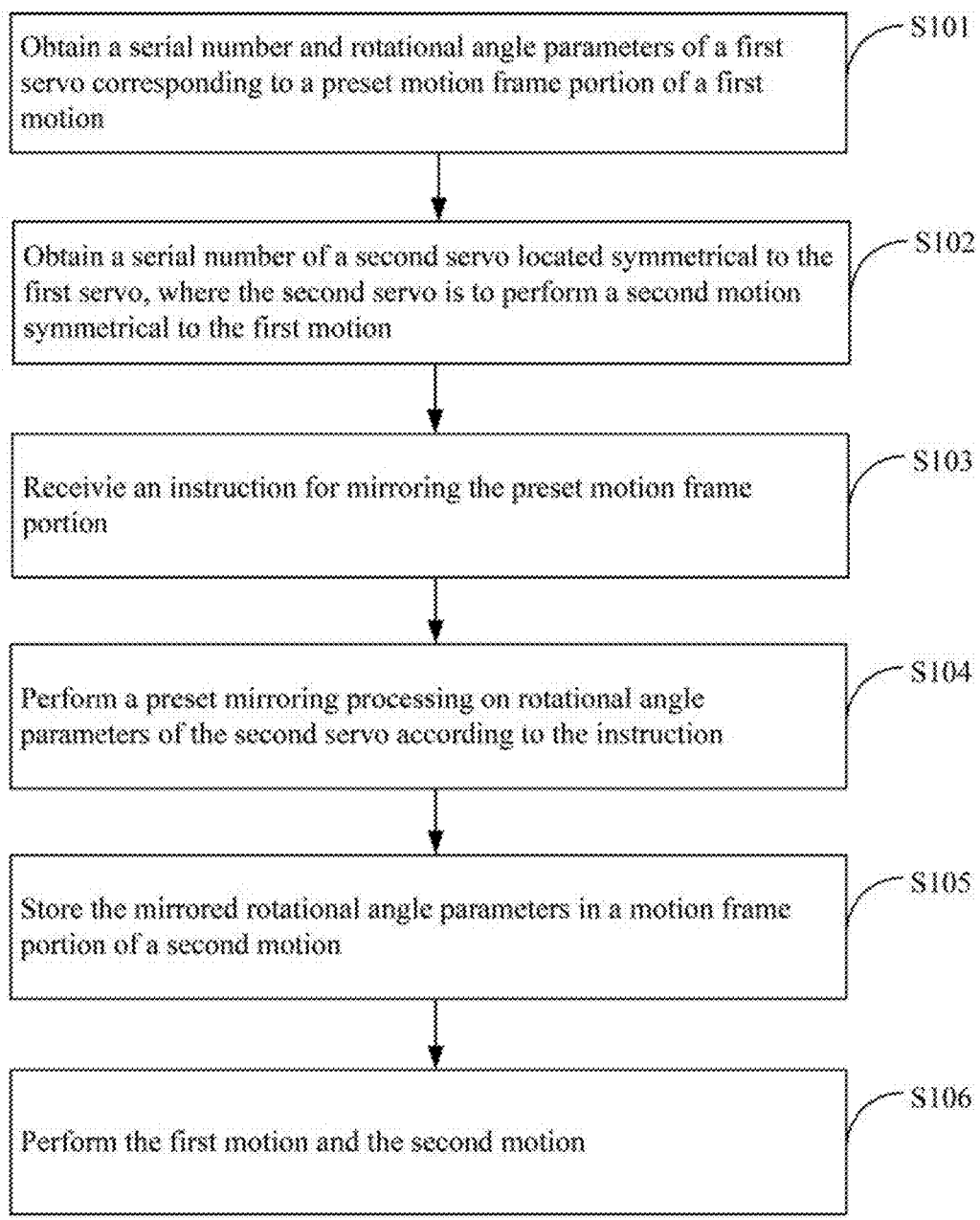
FIG. 1 is a flow chart of an embodiment of a robot control method according to present disclosure.
Figure 4:
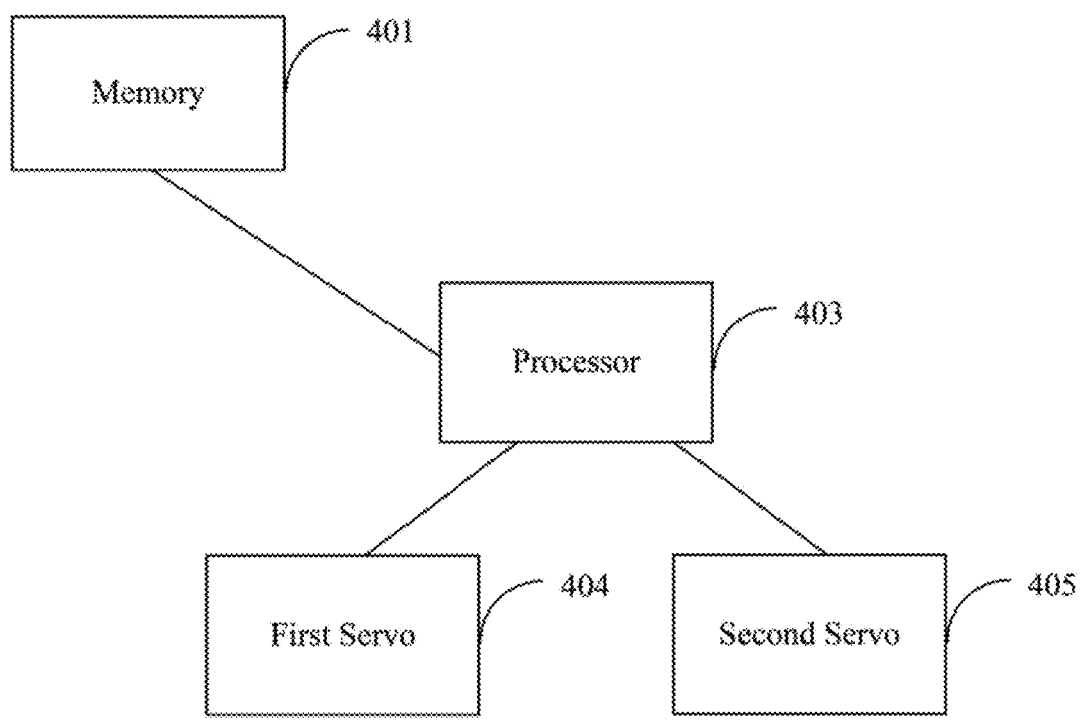
FIG. 4 is a schematic block diagram of an embodiment of a robot control apparatus according to present disclosure.
Figure 5:
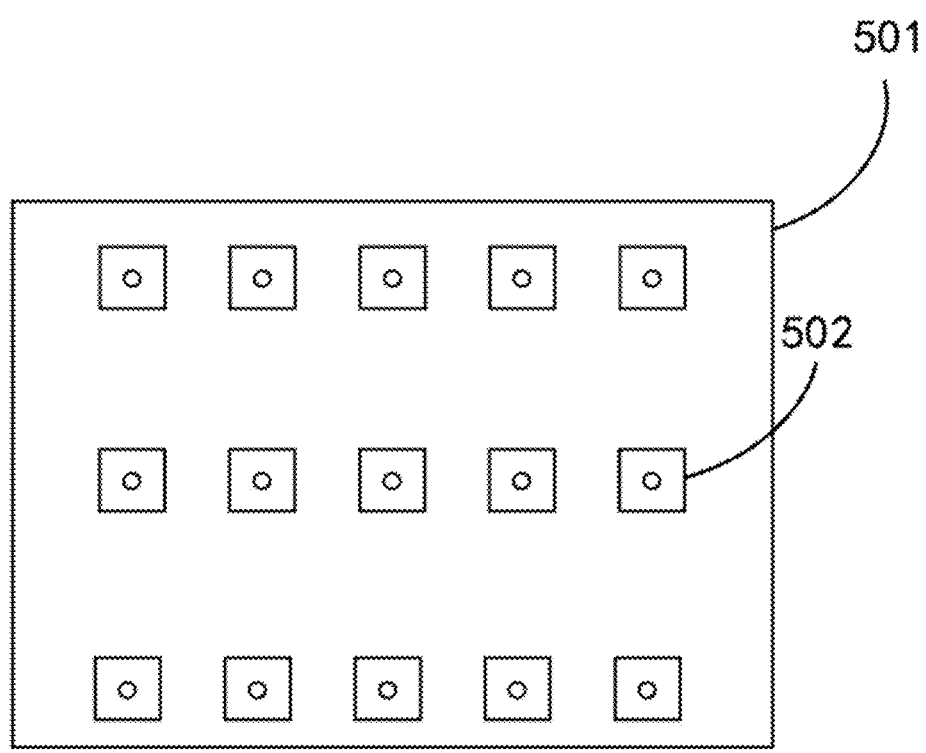
FIG. 5 is a schematic block diagram of an embodiment of a storage medium according to present disclosure.

FIG. 1 is a flow chart of an embodiment of a robot control method according to present disclosure. In this embodiment, a robot control method is provided. The method is a computer-implemented method executable for a processor, which may be implemented through a robot control apparatus as shown in FIG. 4, for example, a portable electronic device or a computer, or through a storage medium as shown in FIG. 5. The method may be applied to servos of a robot having a plurality of servers including a first servo and a second servo (see FIG. 4). As shown in FIG. 1, the method includes the following steps.

S101: obtaining a serial number and rotational angle parameters of a first servo corresponding to a preset motion frame portion of a first motion.

S102: obtaining a serial number of a second servo located symmetrical to the first servo, where the second servo is to perform a second motion symmetrical to the first motion.

Before the process of controlling the robot through the robot control apparatus such as a smart device, it is necessary to establish a remote control between the apparatus and the robot by, for example, providing a control protocol through the apparatus, completing the transmission of a related file through the protocol stack in a signal receiving terminal within the robot, and then the remote control can be performed after the robot decodes the control protocol. It should be noted that, in this embodiment, the remote control between the apparatus and the robot may be realized in the form of a software program or an embedded remote control device, which is not limited herein.

In this embodiment, the robot which is to be controlled by the apparatus mainly includes a living purposed robot such as a home robot, an intelligent mechanical arm, and an intelligent spinning machine, or an industrial robot. Before the robot executes a motion instruction, it is necessary to design and store the motion to be performed by the robot through the apparatus. Generally, one motion includes at least one motion frame, and one motion frame requires multiple servos to cooperate, for example, for the cleaning process of a sweeping robot, it needs to sweep while moving, and multiple servos of the robot are to be rotated. These servos are automatic control devices each consisting of a DC motor, a reduction gear set, sensor(s), and a control circuit, which specifies the output angle of an output shaft of a servo by transmitting a signal.

Figure 2:
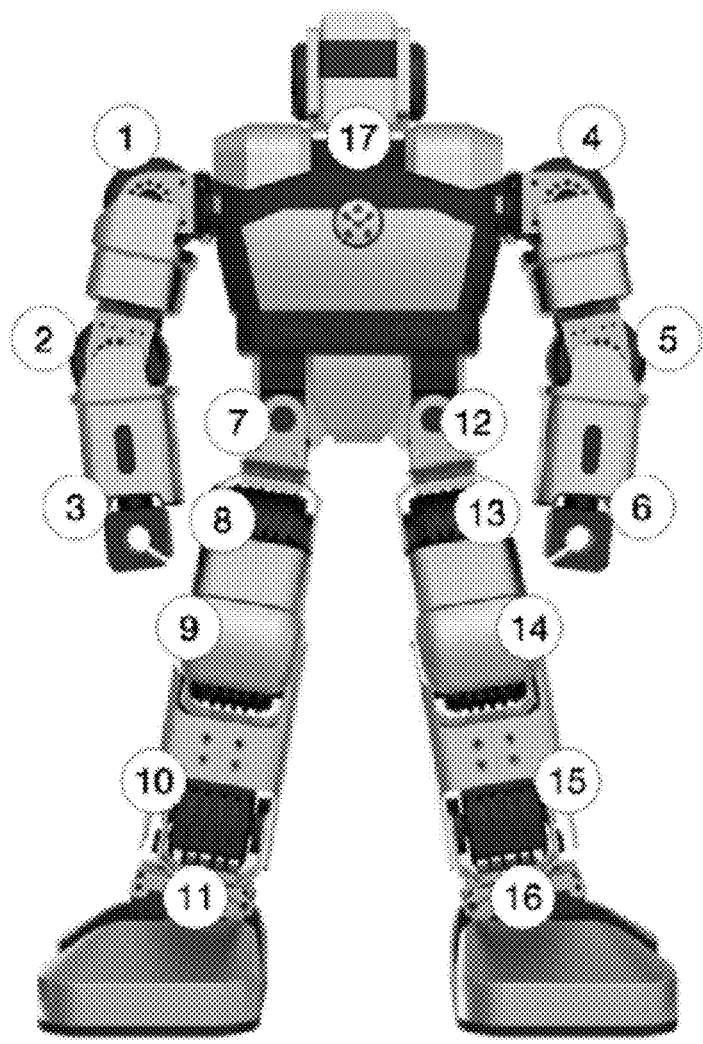
FIG. 2 is a schematic diagram of the robot and its servo number according to the embodiment of FIG. 1.

In this embodiment, it is to adjust the motion frame(s) of the already-edited motion of the robot or to add new motion(s) of the robot. Before establishing the remote control, all the servos of the robot are numbered, the serial numbers of the mutually symmetrical servos are registered and stored, and the apparatus obtains a number and rotational angle parameters of a servo corresponding to the preset motion frame of the robot, where the rotational angle parameters mainly include a rotational angle of an output shaft of the servo, the maximum value of a rotational angle of the corresponding servo and a direction of the rotation of the output shaft of the servo. Specifically, for example, each of the servos of the robot is numbered first, and the serial number of the servo symmetrical to each servo is determined, and then corresponding relationships of the serial numbers are stored while the rotational angle parameters of the servos corresponding to a plurality of motion frames of the robot are collected. FIG. 2 is a schematic diagram of the robot and its servo number according to the embodiment of FIG. 1. Specifically, for example, as shown in FIG. 2, the robot includes 17 servos, where servo 1 is symmetric with servo 4, servo 2 is symmetrical with the servo 5, servo 3 is symmetrical to servo 6, servo 7 is symmetrical with servo 12, servo 8 is symmetrical with servo 13, servo 9 is symmetrical with servo 14, servo 10 is symmetric with servo 15, and servo 11 is symmetrical with servo 16. That is to say, in addition to servo 17, each servo has its symmetrical servo on the robot. Each motion frame of the robot includes the rotational angle parameters of the corresponding servos in servos 1-17. When one motion frame is used, the serial numbers and the rotational angle parameters of the servos corresponding to the motion frame are required. The robot is controlled to perform a motion through the serial numbers and the rotational angle parameters of the servos corresponding to these motion frames stored in the apparatus.

S103: receiving an instruction for mirroring the preset motion frame portion.

S104: performing a preset mirroring processing on rotational angle parameters of the second servo according to the instruction.

S105: storing the mirrored rotational angle parameters in a motion frame portion of a second motion.

S106: performing the first motion and the second motion.

After receiving the instruction for performing a mirroring process to the preset motion frame portion, the apparatus adjusts the rotational angle parameters of the first servo corresponding to the preset motion frame portion according to a received first instruction, and stores the adjusted rotational angle parameters. In the case that a second instruction for performing a mirroring process to the adjusted rotational angle parameters, the preset mirroring processing is performed on the rotational angle parameters of the second servo which is located symmetrical to the first servo according to the second instruction. Briefly, after the apparatus obtains the first instruction, it searches for the corresponding relationships of the servos first, and adjusts (or corrects) the rotational angle parameters of the servos with corresponding numbers by, for example, increasing the angle to raise the left arm by 5 degrees, or increasing the angle to swing the left arm by 10 degrees, and the like. After the adjustment is completed, the adjusted rotational angle parameters are added to the motion frame corresponding to the currently adjusted motion by adding a mirroring motion to the corresponding motion frame or replacing the original information for implementing the function which is in the corresponding motion frame. For example, after mirroring the data of the motion frame for raising the left arm, the editing of the motion frame for raising the right arm is realized. It should be noted that, due to slight errors in the operation state and the installation position of each servo on the robot, these parameters need to be adjusted and stored through the first instruction.

After the adjustment is completed, the apparatus adds the adjusted rotational angle parameters to the rotational angle parameters of the second servo which is located symmetrical to the first servo, and then stores the rotational angle parameters in the motion frame portion of the second motion which is symmetrical to the first motion corresponding to the preset motion frame portion. The motion frame portion of the second motion and the preset motion frame portion can be in a same motion frame or in different motion frames. In general, for the symmetry of the shape of the robot, the directions of the starting position and the ending position of the rotation of every two symmetrical servos installed on the robot are opposite to each other, hence the adjusted rotational angle parameters is subtracted from a threshold of the second servo located symmetrical to the first servo to obtain the symmetrized rotational angle parameters of the second servo located symmetrical to the first servo, where the threshold is the maximum rotational angle of the first servo. In addition, if the directions of the starting position and the ending position of the rotation of the two servos are the same, the adjusted rotational angle parameters can be directly copied to the servo located symmetrically. If both of the above-mentioned situations exist, the positionally symmetrical servos are classified based on the portion and the mode of control first, and then processed uniformly. In which, if the directions of the starling position and the ending position of the rotation of the positionally symmetrical servos are reverse, the adjusted rotational angle parameters are symmetrized and added to the rotational angle parameters of the second servo located symmetrical to the first servo; if the directions of the starting position and the ending position of the rotation of the positionally symmetrical servos are the same, the adjusted rotational angle parameters are copied to the rotational angle parameters of the second servo located symmetrical to the first servo according to the second instruction. In such a manner, the two kinds of positionally symmetrical servos can be mirrored individually.

In this embodiment, referring to FIG. 2, it is assumed that the directions of the starting position and the ending position of the rotation of the positionally symmetrical servos of the robot are opposite. If the adjusted rotational angle parameter in the first instruction is stretching the left leg of the robot, servo 8 and servo 9 are moved while the other servos are remained unmoved. Since the directions of the starting position and the ending position of the rotation of servo 8 and servo 9 of the knee portion of the robot during performing this motion are opposite to that of the corresponding servo 13 and servo 14, the rotational angle of servo 8 is subtracted from the maximum rotational angle of servo 13 to obtain the rotational angle of servo 13. Similarly, the rotational angle of servo 9 is subtracted from the maximum rotational angle of servo 14 to obtain the rotational angle of servo 14. Since the positionally symmetrical servos have a same type, the maximum rotational angles of servo 13 and servo 8 are the same, and the maximum rotational angles of servo 14 and servo 9 are the same, the symmetrized rotational angle parameters of the second servo located symmetrical to the first servo can be obtained by directly subtracting the adjusted rotational angle parameters from extreme rotational angle parameters of the current servo.

Furthermore, if the speed to perform the mirroring motion is to be controlled, the rotational speeds of servo 8 and servo 9 are copied to the corresponding servo 13 and servo 14 directly, and then the rotational speeds of servo 13 and servo 14 are adjusted to complete the adjustment of the speed to perform the mirroring motion. If servo 17 which locates at the middle part of the robot is to be controlled, since the servo 17 is normally at an angle of 45 degrees, as shown in FIG. 2, it can be turned leftwardly to reduce the angle while turned rightwardly to add the angle, that is, servo 17 is adjusted according to its motion direction and installation angle in the process of the mirroring a motion. Hence, in this embodiment, the rotational angle of servo 17 after adjustment=90 degrees− the rotational angle of servo 17 before adjustment.

In the process of the robot executing a motion, especially for a complex motion, each motion is composed of a plurality of continuous motion frames, and the corresponding servos of each motion frame have different execution times during performing the corresponding operation. Therefore, in the process of the mirroring a motion, the apparatus sequentially obtains the adjusted rotational angle parameters and the serial numbers of the corresponding servos of each motion frame in the preset motion of the robot, sequentially adjusts the serial number and the rotational angle parameters of each corresponding servo in time order to make the robot completes the mirroring symmetrical motion.

Specifically, referring to FIG. 2, in the process of the robot performing the left-hand salute, servo 1 obtains an instruction transmitted by the apparatus and performs the motion of lifting the arm of the robot, and servo 2 performs the bending of the arm according to the control instruction, and finally servo 3 performs the corresponding motion of the palm of the robot. If the motion of the above-mentioned left-hand salute is to be mirrored, the adjusted rotational angle parameters of each motion frame of servo 1, servo 2, and servo 3 which correspond to the left-hand salute are obtained in sequence first, and the adjusted rotational angle parameters of each motion frame of servo 1, servo 2, and servo 3 which correspond to the left-hand salute are adjusted according to the time sequence of the execution of each motion frame, and then the preset mirroring processing is performed on the adjusted rotational angle parameters respectively. After that, the apparatus will obtain the rotational angle parameters of the corresponding servos during the right-hand salute, which include the rotational angle parameters of servo 4, servo 5, and servo 6. During performing the right-hand salute, based on the time sequence which the apparatus transmits the instruction, servo 4 performs the motion of lifting the arm according to the adjusted rotational angle parameters first, then servo 5 performs the bending of the arm according to the adjusted rotational angle parameters, and finally servo 6 performs the corresponding motion of the palm, that is, the process of generating the mirroring motion is realized by respectively mirroring the adjusted rotational angle parameters of each motion frame in the preset motion of the robot.

Different from the prior art, in this embodiment, the robot control method obtains a number and rotational angle parameters of a servo of a robot corresponding to a preset motion frame portion of the robot through a robot control apparatus first, then performs a preset mirroring processing on rotational angle parameters of another servo of the robot which located symmetrical to the servo of the robot corresponding to the preset motion frame portion, and then stores the mirrored rotational angle parameters in a motion frame of a second motion which is symmetrical to a first motion corresponding to the preset motion frame portion. In the above-mentioned manner, the difficulty in adjusting the motion frame in the mirroring operation of the robot is largely simplified, and the accuracy and efficiency of the mirroring operation are improved.

Figure 3:
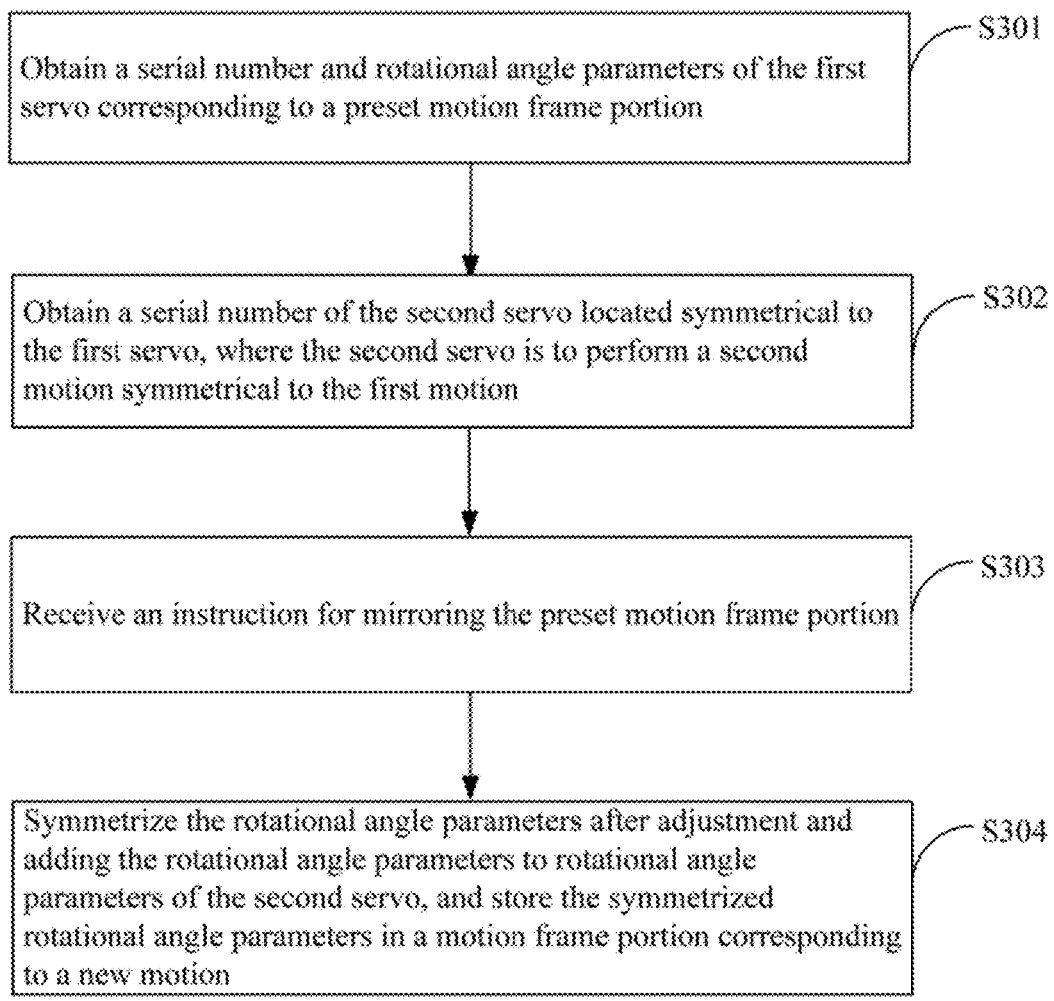
FIG. 3 is a flow chart of another embodiment of a robot control method according to present disclosure.

FIG. 3 is a flow chart of another embodiment of a robot control method according to present disclosure. In this embodiment, a robot control method is provided. The method is a computer-implemented method executable for a processor, which may be implemented through a robot control apparatus as shown in FIG. 4, for example, a portable electronic device or a computer, or through a storage medium as shown in FIG. 5. The method may be applied to servos of a robot having a plurality of servers including a first servo and a second servo (see FIG. 4). As shown in FIG. 3, a robot control method includes the following steps.

S301: obtaining a serial number and rotational angle parameters of the first servo corresponding to a preset motion frame portion.

S302: obtaining a serial number of the second servo located symmetrical to the first servo, where the second servo is to perform a second motion symmetrical to the first motion.

In this embodiment, the robot used is bilaterally symmetrical robots. Before executing the first instruction, all the servos of the robot are numbered, and the serial numbers of the mutually symmetrical servos are registered and stored.

S303: receiving an instruction for mirroring the preset motion frame portion.

S304: symmetrizing the rotational angle parameters after adjustment and adding the rotational angle parameters to rotational angle parameters of the second servo, and storing the symmetrized rotational angle parameters in a motion frame portion corresponding to a new motion.

In this embodiment, the apparatus adjusts the rotational angle parameters of the first servo corresponding to the preset motion frame portion according to the received first instruction, and stores the adjusted rotational angle parameters; receives the second instruction for mirroring the adjustment, and performs a preset mirroring processing on the rotational angle parameters of the second servo which is located symmetrical to the first servo according to the second instruction, and adds the adjusted rotational angle parameters after the preset mirroring processing to the rotational angle parameters of the second servo which is located symmetrical to the first servo, and stores the symmetrized rotational angle parameters in the motion frame corresponding to the new motion.

Specifically, after the first instruction is obtained, correspondence relationships of the servos are searched first, and the serial numbers and the rotational angle parameters of the corresponding servos are adjusted while the serial numbers and the adjusted rotational angle parameters of the corresponding servos of the first instruction are stored. If a mirror of the preset motion frame portion is to be added to another motion, after receiving the instruction for mirroring the preset motion frame portion, the preset mirroring processing can be performed on the rotational angle parameters of the second servo which is located symmetrical to the first servo of the robot according to the content in the second instruction, and the processed rotational angle parameters can be stored in the motion frame corresponding to the new motion, so that the new motion can be added to the mirror of the preset motion frame portion during the execution process.

In addition, the mirror of the preset motion frame portion which is added in the new motion can be positioned before and after any motion frame in the new motion. In the case that the motion frame in the first instruction has no conflict with the new motion, the mirror of the preset motion frame portion can further be directly integrated with any motion frame in the new motion. Specifically, if the robot is to perform a motion of the right-hand salute, the rotational angle parameters of the left palm of the robot can be mirrored and then imported into the adjusted rotational angle parameters of raising the right hand of the robot, so as to complete the motion of the right-hand salute of the robot.

In this embodiment, two positionally symmetrical servos have a same type. However, since there are differences in the operation of the mutually positionally symmetrical servos, the rotational directions from the starting position to the ending position of the output shaft of the positionally symmetrical servos may be in different situations such as the directions are the same or the opposite while the servos are installed. In the case that the rotational directions are the same, after the apparatus receives the second instruction, the adjusted rotational angle parameters are copied to the rotational angle parameters of the second servo which is located symmetrical to the first servo, and the processed rotational angle parameters of the servos are stored to the motion frame corresponding to the new motion; otherwise, after the apparatus receives the second instruction, the adjusted rotational angle parameters are symmetrized according to the second instruction then added to the rotational angle parameters of the second servo which is located symmetrical to the first servo, and the processed rotational angle parameters of the servos are stored to the motion frame corresponding to the new motion. Generally, there will be two kinds of the above-mentioned positionally symmetrical servos, and the positionally symmetrical servos can be classified based on the portion and the mode of control first, and then processed uniformly. If the directions of the starting position and the ending position of the rotation of the positionally symmetrical servos are reverse, the adjusted rotational angle parameters are symmetrized and added to the rotational angle parameters of the second servo located symmetrical to the first servo; if the directions of the starting position and the ending position of the rotation of the positionally symmetrical servos are the same, the adjusted rotational angle parameters are copied to the rotational angle parameters of the second servo located symmetrical to the first servo according to the second instruction, so that the two kinds of positionally symmetrical servos can be mirrored individually.

For the specific execution process, please refer to FIG. 1-FIG. 2 and the related description of any embodiment, which are not described herein.

It should be noted that, in this embodiment, the servos are not to limit the present disclosure, and the mirroring of other devices such as a motor, a speed sensor, and an acceleration sensor may be completed by the methods, and then realize the robot control method by the above-mentioned control manner, which is not limited herein.

Different from the above-mentioned embodiment, in this embodiment, by adding a motion frame to a new motion, the robot is enabled to complete a variety of new motions. In the above-mentioned manner, the editing of the motion of the robot is largely simplified.

FIG. 4 is a schematic block diagram of an embodiment of a robot control apparatus according to present disclosure. For the convenience of description, only parts related to this embodiment are shown. In this embodiment, the apparatus may be, for example, a portable electronic device or a computer. As shown in FIG. 4, a robot control apparatus includes a memory 401, a processor 403, a first servo 404, and a second servo 405 which are coupled with each other. The memory 401 is configured to store a computer program executed by the processor 403 and intermediate data generated when the computer program is executed. The processor 403 is configured to execute the following steps:

obtaining a serial number and a rotational angle parameter of the first servo 404 corresponding to a preset motion frame portion of a first motion; obtaining a serial number of the second servo 405 located symmetrical to the first servo 404, where the second servo 405 is to perform a second motion symmetrical to the first motion; receiving an instruction for mirroring the preset motion frame portion, and performing a preset mirroring processing on a rotational angle parameter of the second servo 405 according to the instruction; storing the mirrored rotational angle parameter in a motion frame portion of a second motion; and performing the first motion and the second motion.

For the specific execution process, please refer to FIG. 1-FIG. 3 and the related description of any embodiment, which are not described herein.

Different from the prior art, in this embodiment, it obtains a number and rotational angle parameters of a servo of a robot corresponding to a preset motion frame portion of the robot first, then performs a preset mirroring processing on rotational angle parameters of another servo of the robot which located symmetrical to the servo of the robot corresponding tai the preset motion frame portion, and then stores the mirrored rotational angle parameters in a motion frame of a second motion which is symmetrical to a first motion corresponding to the preset motion frame portion. In the above-mentioned manner, the difficulty in adjusting the motion frame in the mirroring operation of the robot is largely simplified, and the accuracy and efficiency of the mirroring operation are improved.

Furthermore, the present disclosure further provides a storage medium. FIG. 5 is a schematic block diagram of an embodiment of a storage medium according to present disclosure. As shown in FIG. 5, a storage medium 501 includes program data 502. The program data 502 can be executed to implement any of the above-mentioned control methods. In a specific embodiment, the storage medium 501 may be a storage chip, a hard disk, or a portable hard disk in a terminal device, or other readable and writable storage means such as a flash memory and an optical disk, a server, or the like.

Different from the prior art, in this embodiment, a storage medium is provided, where the program data is stored in the storage medium. When the program data is executed, it obtains a number and rotational angle parameters of a servo of a robot corresponding to a preset motion frame portion of the robot first, then performs a preset mirroring processing on rotational angle parameters of another servo of the robot which located symmetrical to the servo of the robot corresponding to the preset motion frame portion, and then stores the mirrored rotational angle parameters in a motion frame of a second motion which is symmetrical to a first motion corresponding to the preset motion frame portion. In the above-mentioned manner, the difficulty in adjusting the motion frame in the mirroring operation of the robot is largely simplified, and the accuracy and efficiency of the mirroring operation are improved.

The forgoing is only the embodiments of the present disclosure, and is not intended to limit the scope of the present disclosure. The equivalent structure or equivalent process transformations made using the specification and the drawings of the present disclosure, or the directly or indirectly application to other related technologies, are all included in the scope of protection of the present disclosure.

What is claimed is:

1. A computer-implemented robot control method for a robot having servos for performing motions, comprising executing on a processor of a robot control apparatus the steps of:

obtaining a serial number and a rotational angle parameter of a first servo corresponding to a preset motion filmic portion of a first motion;

obtaining a serial number of a second servo located symmetrical to the first servo, wherein the second servo is to perform a second motion symmetrical to the first motion;

receiving an instruction for mirroring the preset motion frame portion;

performing a preset mirroring processing on a rotational angle parameter of the second servo according to the instruction; and storing the mirrored rotational angle parameter in a motion frame portion of a second motion;

performing the first motion and the second motion.

2. The method of claim 1, wherein the step of receiving the instruction for mirroring the preset motion frame portion and the step of performing the preset mirroring processing on the rotational angle parameter of the second servo according to the instruction comprises:

adjusting the rotational angle parameter of the first servo corresponding to the preset motion frame portion according to a received first instruction, and storing the adjusted rotational angle parameter; and receiving a second instruction for mirroring the adjustment, and performing the preset mirroring processing on the rotational angle parameter of the second servo according to the second instruction.

3. The method of claim 2, wherein the step of performing the preset mirroring processing on the rotational angle parameter of the second servo according to the second instruction comprises:

symmetrizing the adjusted rotational angle parameter and adding to the rotational angle parameter of the second servo, and storing the adjusted rotational angle parameter in the motion frame portion of the second motion.

4. The method of claim 3, wherein the step of symmetrizing the adjusted rotational angle parameter and adding to the rotational angle parameter of the second servo comprises:

subtracting the adjusted rotational angle parameters from a threshold of the second servo to obtain the symmetrized rotational angle parameter of the second servo, wherein the positionally symmetrical servos have a same type.

5. The method of claim 4, wherein the threshold is a maximum rotational angle of an output shaft of the second servo.

6. The method of claim 1, wherein the step of receiving the instruction for mirroring the preset motion frame portion and the step of performing the preset mirroring processing on the rotational angle parameter of the second servo according to the instruction comprises:

receiving the instruction for mirroring the preset motion frame portion; and symmetrizing the rotational angle parameter after adjustment and adding the rotational angle parameter to the rotational angle parameter of the second servo, and storing the symmetrized rotational angle parameter in a motion frame portion corresponding to a new motion.

7. The method of claim 1, wherein the rotational angle parameter of the first servo coni rises a rotational angle of an output shaft of the first servo.

8. The method of claim 1, wherein before the step of obtaining the serial number and the rotational angle parameter of the first servo corresponding to the preset motion frame portion of the first motion further comprises:

numbering all the servos of the robot, and registering and storing the servo numbers of the mutually symmetrical servos.

9. The method of claim 1, wherein the motion frame portion of the second motion and the preset motion frame portion are either in a same motion frame or in different motion frames.

10. A robot control apparatus for a robot, comprising:
a first servo;
a second servo;
a memory;
a processor; and
one or more computer programs stored in the memory and executable on the processor, wherein the one or more computer programs comprise:

instructions for obtaining a serial number and a rotational angle parameter of a first servo corresponding to a preset motion frame portion of a first motion;

instructions tor obtaining a serial number of a second servo located symmetrical to the first servo, wherein the second servo is to perform a second motion symmetrical to the first motion;

instructions for receiving an instruction for mirroring the preset motion frame portion;

instructions for performing a preset mirroring processing on a rotational angle parameter of the second servo according to the instruction; and instructions for storing the mirrored rotational angle parameter in a motion frame portion of a second motion;

instructions for performing the first motion and the second motion.

11. The apparatus of claim 10, wherein the instructions for receiving the instruction for mirroring the preset motion frame portion and the instructions for performing the preset mirroring processing on the rotational angle parameter of the second servo according to the instruction comprise:

instructions for adjusting the rotational angle parameter of the first servo corresponding to the preset motion frame portion according to a received first instruction, and storing the adjusted rotational angle parameter; and instructions for receiving a second instruction for mirroring the adjustment, and performing the preset mirroring processing on the rotational angle parameter of the second servo according to the second instruction.

12. The apparatus of claim 11, wherein the instructions for performing the preset mirroring processing on the rotational angle parameter of the second servo according to the second instruction comprise:

instructions for symmetrizing the adjusted rotational angle parameter and adding to the rotational angle parameter of the second servo, and storing the adjusted rotational angle parameter in the motion frame portion of the second motion.

13. The apparatus of claim 12, wherein the instructions for symmetrizing the adjusted rotational angle parameter and adding to the rotational angle parameter of the second servo comprise:

instructions for subtracting the adjusted rotational angle parameters from a threshold of the second servo to obtain the symmetrized rotational angle parameter of the second servo, wherein the positionally symmetrical servos have a same type.

14. The apparatus of claim 13, wherein the threshold is a maximum rotational angle of an output shaft of the second servo.

15. The apparatus of claim 10, wherein the instructions for receiving the instruction for mirroring the preset motion frame portion and the step of performing the preset mirroring processing on the rotational angle parameter of the second servo according to the instruction comprise:
> instructions for receiving the instruction tor mirroring the preset motion frame portion; and
> instructions for symmetrizing the rotational angle parameter after adjustment and adding the rotational angle parameter to the rotational angle parameter of the second servo, and storing the symmetrized rotational angle parameter in a motion frame portion corresponding to a new motion.

16. The apparatus of claim 10, wherein the rotational angle parameter of the first servo comprises a rotational angle of an output shaft of the first servo.

17. The apparatus of claim 10, wherein the one or more computer programs further comprise:
> instructions for numbering all the servos of the robot, and registering and storing the serial numbers of the mutually symmetrical servos.

18. The apparatus of claim 10, wherein the motion frame portion of the second motion and the preset motion frame portion are either in a same motion frame or in different motion frames.

19. A non-transitory computer readable storage medium storing a computer program, wherein the computer program comprises:
> instructions for obtaining a serial number and a rotational angle parameter of a first servo corresponding to a preset motion frame portion of a first motion;
> instructions for obtaining a serial number of a second servo located symmetrical to the first servo, wherein the second servo is to perform a second motion symmetrical to the first motion;
> instructions for receiving an instruction for mirroring the preset motion frame portion;
> instructions for performing a preset mirroring processing on a rotational angle parameter of the second servo according to the instruction; and
> instructions for storing the mirrored rotational angle parameter in a motion frame portion of a second motion;
> instructions for performing the first motion and the second motion.

20. The medium of claim 19, wherein the instructions for receiving the instruction for mirroring the preset motion frame portion and the instructions for performing the preset mirroring processing on the rotational angle parameter of the second servo according to the instruction comprise:
> instructions for adjusting the rotational angle parameter of the first servo corresponding to the preset motion frame portion according to a received first instruction, and storing the adjusted rotational angle parameter; and
> instructions for receiving a second instruction for mirroring the adjustment, and performing the preset mirroring processing on the rotational angle parameter of the second servo according to the second instruction.

* * * * *